United States Patent
Matano et al.

(10) Patent No.: US 6,400,884 B1
(45) Date of Patent: Jun. 4, 2002

(54) MATERIAL FOR TEMPERATURE COMPENSATION, AND OPTICAL COMMUNICATION DEVICE

(75) Inventors: Takahiro Matano, Echi-gun; Akihiko Sakamoto, Koka-gun, both of (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/830,857

(22) PCT Filed: Jul. 4, 2000

(86) PCT No.: PCT/JP00/04436
§ 371 (c)(1),
(2), (4) Date: May 1, 2001

(87) PCT Pub. No.: WO01/04672
PCT Pub. Date: Jan. 18, 2001

(30) Foreign Application Priority Data

| Jul. 7, 1999 | (JP) | 11-192954 |
| Aug. 23, 1999 | (JP) | 11-236201 |
| May 28, 2000 | (JP) | 2000-135057 |
| Jun. 15, 2000 | (JP) | 2000-180101 |

(51) Int. Cl.$^7$ .............................................. G02B 6/00
(52) U.S. Cl. ...................... 385/137; 385/14; 385/42; 385/37; 385/141
(58) Field of Search .................. 385/14, 42, 134, 385/137, 141, 129, 37

(56) References Cited

U.S. PATENT DOCUMENTS

| 4,788,046 A | * 11/1988 | Barringer et al. | 423/122 |
| 5,017,519 A | * 5/1991 | Morimoto et al. | 501/7 |
| 5,042,898 A | * 8/1991 | Morey et al. | 385/37 |
| 5,426,714 A | * 6/1995 | Gadkaree et al. | 385/39 |
| 6,087,280 A | * 7/2000 | Beall et al. | 501/7 |
| 6,209,352 B1 | * 4/2001 | Beall et al. | 65/30.1 |

FOREIGN PATENT DOCUMENTS

| EP | 812810 | 12/1997 | ............... 385/14 X |
| EP | 828169 | 3/1998 | ............... 385/14 X |
| EP | 995723 | 4/2000 | ............... 385/14 X |
| JP | 2000-503415 | 3/2000 | ............... 385/14 X |
| JP | 2000-119042 | 4/2000 | ............... 385/137 X |
| JP | 2000-503967 | 4/2000 | ............... 385/14 X |
| WO | 97/26572 | 7/1997 | ............... 385/141 X |
| WO | 97/28480 | 8/1997 | ............... 385/141 X |
| WO | 99/64898 | 12/1999 | ............... 385/14 X |
| WO | 00/50360 | 8/2000 | ............... 385/141 X |
| WO | 00/55659 | 9/2000 | ............... 385/42 X |

OTHER PUBLICATIONS

M.. Kato et al. C–3–54: The Package with glass ceramics of Thermal compensated Fiber Bragg.

Gratings; Proceedings of general meeting in 1999, The Institute of Electronics, Information and Communication Engineers, Electronics 1, (Mar. 8, 1999), p. 208.

Weidman D L et al.: "A novel negative expansion substrate material for athermalizing fiber Bragg gratings"; ECOC '96., Proceedings of European Conference on Optical Communication, Oslo, Norway, (Sep. 15–19, 1996), pp. 61–64.

Akihiko Sakamoto et al., "C–3–95; Adhesion Properties of Negative Expansion Ceramic Substrate for Athermalization of Fiber Bragg Gratings", Proceedings of Electronics Society Meeting (1999), The Institute of Electronics, Information and Communication Engineers, vol. 1, (Aug., 16, 1999), p. 201.

Y. Hori et al. (1997) "Temperature–compensated Packages for Fiber Bragg Gratings", The Institute of Electronics, Information and Communication Engineers, C–3–46.

* cited by examiner

*Primary Examiner*—Brian Healy
(74) *Attorney, Agent, or Firm*—Collard & Roe, P.C.

(57) ABSTRACT

A temperature compensating member which comprises a polycrystalline body containing, as a main crystal, one of β-quartz solid solution and β-eucryptite solid solution, and it has a value less than 3.52 Å as an interplanar spacing of the crystal planes giving a main peak in X-ray diffraction measurement, and has a negative coefficient of thermal expansion.

7 Claims, 4 Drawing Sheets

MATERIAL FOR TEMPERATURE COMPENSATION, AND OPTICAL COMMUNICATION DEVICE

CROSS REFERENCE TO RELATED APPLICATIONS

Applicants claim priority under 35 U.S.C. §119 of Japanese Application Nos. 192954/1999, 236201/1999, 135057/2000, and 180101/2000 filed Jul. 7, 1999, Aug. 23, 1999, May 8, 2000, and Jun. 15, 2000, respectively. Applicants also claim priority under 35 U.S.C. §120 of PCT/JP00/04436 filed Jul. 4, 2000. The international application under PCT article 21(2) was not published in English.

TECHNICAL FIELD

This invention relates to a temperature compensating member having a negative coefficient of thermal expansion and an optical communication device using the same.

BACKGROUND ART

With the advance of the optical communication technology, a network using optical fibers has been rapidly built up. In the network, a wavelength multiplexing technique of collectively transmitting light beams having a plurality of different wavelengths has come into use, and a wavelength filter, a coupler, a waveguide, and the like have become important devices.

Some of the devices of the type described are changed in characteristics depending upon the temperature and may therefore cause troubles if used in the outdoors. This requires a technique for keeping the characteristics of these devices fixed or unchanged regardless of a temperature change, i.e., a so-called temperature compensating technique.

As a typical optical communication device which requires temperature compensation, there is a fiber Bragg grating (hereinbelow, referred to as FBG). The FBG is a device in which a portion varied in refractive index in a grid-like pattern, i.e., a so-called grating is formed within a core of an optical fiber, and has a characteristic of reflecting a light beam having a specific wavelength according to the relationship represented by the following formula (1). Therefore, the device attracts attention as an important optical device in the optical communication system using a wavelength division multiplex transmission technique in which optical signals different in wavelengths are multiplexed and transmitted through a single optical fiber.

$$\lambda = 2n\Lambda \quad (1)$$

Herein, $\lambda$ represents a reflection wavelength, n, an effective refractive index of the core, and $\Lambda$, a grid interval of the portion varied in refractive index in the grid-like pattern.

However, the above-mentioned FBG has a problem that the reflection wavelength will be varied following the change in ambient temperature. The temperature dependency of the reflection wavelength is represented by the following formula (2) which is obtained by differentiating the formula (1) with the temperature T.

$$\partial \lambda / \partial T = 2\{(\partial n / \partial T)\Lambda + n(\partial \Lambda / \partial T)\} \quad (2)$$
$$= 2\Lambda\{(\partial n / \partial T) + n(\partial \Lambda / \partial T)/\Lambda\}$$

The second term of the right side of the formula (2), i.e., $(\partial \Lambda / \partial T)/\Lambda$ corresponds to a coefficient of thermal expansion of the optical fiber and has a value approximately equal to $0.6 \times 10^{-6}/°$ C. On the other hand, the first term of the right side corresponds to the temperature dependency of a refractive index of the core portion of the optical fiber and has a value approximately equal to $7.5 \times 10^{-6}/°$ C. Thus, it will be understood that the temperature dependency of the reflection wavelength depends on both the variation in refractive index of the core portion and the change in grid interval due to thermal expansion but mostly results from the temperature-dependent variation of the refractive index.

As means for avoiding the above-mentioned variation in reflection wavelength, there is known a method in which the FBG is applied with tension depending upon the temperature change to thereby change the grid interval so that a component resulting from the variation in refractive index is cancelled.

As a specific example of the above-mentioned method, proposal is made of a method in which the FBG is fixed to a temperature compensating member which comprises a combination of a material, such as an alloy or a silica glass, having a small coefficient of thermal expansion and a metal, such as aluminum, having a large coefficient of thermal expansion. Specifically, as shown in FIG. 1, an Invar (trademark) bar 10 having a small coefficient of thermal expansion has opposite ends provided with Al brackets 11a and 11b having a relatively large coefficient of thermal expansion attached thereto, respectively. An optical fiber 13 is fixed to these brackets 11a and 11b by the use of clasps 12a and 12b so that the optical fiber is stretched under a predetermined tension. At this time, adjustment is made so that the grating portion 13a of the optical fiber 13 is located between the two clasps 12a and 12b.

If the ambient temperature rises in the above-mentioned state, the brackets 11a and 11b are expanded to reduce the distance between the two clasps 12a and 12b so that the tension applied to the grating portion 13a of the optical fiber 13 is decreased. On the other hand, as the ambient temperature falls, the brackets 11a and 11b are contracted to increase the distance between the two clasps 12a and 12b so that the tension applied to the grating portion 13a of the optical fiber 13 is increased. Thus, by changing the tension applied to the FBG depending upon the temperature change, it is possible to adjust the grid interval of the grating portion. As a result, it is possible to cancel the temperature dependency of the reflection center wavelength.

However, the above-mentioned temperature compensating device is disadvantageous in that the structure is complicated and the handling is difficult.

As a method for solving the above-mentioned disadvantages, Japanese Unexamined Patent Publication No. 2000-503415 or Japanese Unexamined Patent Publication No. 2000-503967 discloses a method shown in FIG. 2, in which a FBG 16 is, under a tension applied by a weight 15, fixed to a glass ceramic substrate 14 having a negative coefficient of thermal expansion, by use of an adhesive 17, which substrate is obtained by heat-treating and crystallizing a raw glass material preliminarily formed into a plate shape. The tension is controlled by expansion or contraction of the glass ceramic substrate 14. In order to cancel the temperature dependency of the reflection center wavelength, it is necessary to apply a stress in a direction of contraction of the FBG when temperature rises and in a direction of expansion when temperature falls, as described above. As long as the substrate material has a negative coefficient of thermal expansion, such stress can be produced by a single component. The invention disclosed in the Japanese Unexamined Patent Publication No. 2000-503415 or the Japanese Unexamined Patent Publication No. 2000-503967 is achieved on the basis of the function and the effect mentioned above. In FIG. 2, 16a represents a grating portion.

The method disclosed in the Japanese Unexamined Patent Publication No. 2000-503415 or the Japanese Unexamined Patent Publication No. 2000-503967 is advantageous in that the structure is simple and the handling is easy because temperature compensation is achieved by a single component. However, there is a problem that the glass ceramic member used in the method is large in hysteresis of thermal expansion. The hysteresis of thermal expansion is a phenomenon in which, when a material expands or contracts following a temperature change, an expanding behavior upon temperature elevation does not coincide with that upon temperature drop.

In addition, the Japanese Unexamined Patent Publication No. 2000-503415 or the Japanese Unexamined Patent Publication No. 2000-503967 discloses a method for the purpose of diminishing the hysteresis of the glass ceramic member, in which a heat-cycle treatment is carried out at a temperature between 400 and 800° C. to stabilize an internal structure. However, the hysteresis diminished by the method described above is unstable against a change in environment such as temperature or humidity and it is therefore difficult to maintain its initial value. Further, the above-mentioned heat treatment requires a complicated manufacturing process, resulting in a problem of a high cost.

Therefore, it is an object of the present invention to provide a temperature compensating member which is small in hysteresis of thermal expansion, high in environmental stability, and capable of being manufactured at a low cost.

It is another object of the present invention to provide an optical communication device using the above-described temperature compensating member.

DISCLOSURE OF THE INVENTION

In order to accomplish the above-mentioned objects, the present inventors have conducted various experiments and, as a result, found out that a temperature compensating member diminished in histeresis of thermal expansion and excellent in environmental stability is obtained by controlling the crystal structure of a polycrystalline body which forms the temperature compensating member. This leads to a proposal of the present invention.

According to one aspect of the present invention, there is provided a temperature compensating member which comprises a polycrystalline body containing, as a main crystal, one of β-quartz solid solution and β-eucryptite solid solution, which has a value less than 3.52 Å as an interplanar spacing of the crystal planes giving a main peak in X-ray diffraction measurement, and which has a negative coefficient of thermal expansion.

The polycrystalline body may be a sintered powder body.

The above-mentioned temperature compensating member may have a coefficient of thermal expansion of $(-25$ to $-120) \times 10^{-7}/°$ C. within a temperature range between $-40$ and $100°$ C.

According to another aspect of the present invention, there is provided an optical communication device comprising the above-described temperature compensating member and an optical component having a positive coefficient of thermal expansion and fixed on one surface of the temperature compensating member.

The optical communication device may further comprise a reinforcing member adhered to the other surface of the temperature compensating member by the use of an adhesive having a low elasticity.

The reinforcing member may be a columnar member having a through-hole, and the temperature compensating member may be placed in the through-hole of the reinforcing member.

The optical component may be fixed to the temperature compensating member by the use of an adhesive which comprises an organic polymer and has a viscosity between 2500 and 100000 mPa·s at 25° C. prior to curing and a contracting rate of 5% or less upon curing.

It is noted here that the interplanar spacing means a distance between various crystal planes in the crystals forming the polycrystalline body. The present invention is concerned with the crystal plane giving the main peak in the X-ray diffraction.

BEST MODE FOR EMBODYING THE INVENTION

A temperature compensating member according to an embodiment of the present invention comprises a polycrystalline body containing, as a main crystal, one of β-quartz solid solution and β-eucryptite solid solution, has a value less than 3.52 Å as an interplanar spacing of the crystal planes giving a main peak in X-ray diffraction measurement, and has a negative coefficient of thermal expansion.

Figure 1:
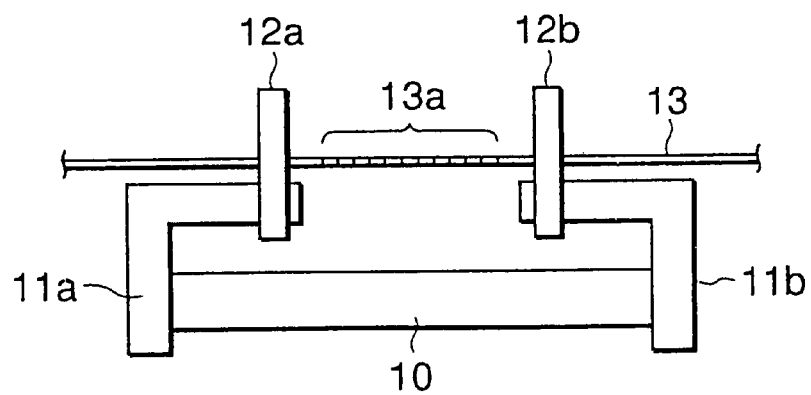
FIG. 1 is a front view showing a conventional device for preventing variation in reflection wavelength of an FBG in response to a temperature change.
Figure 2:
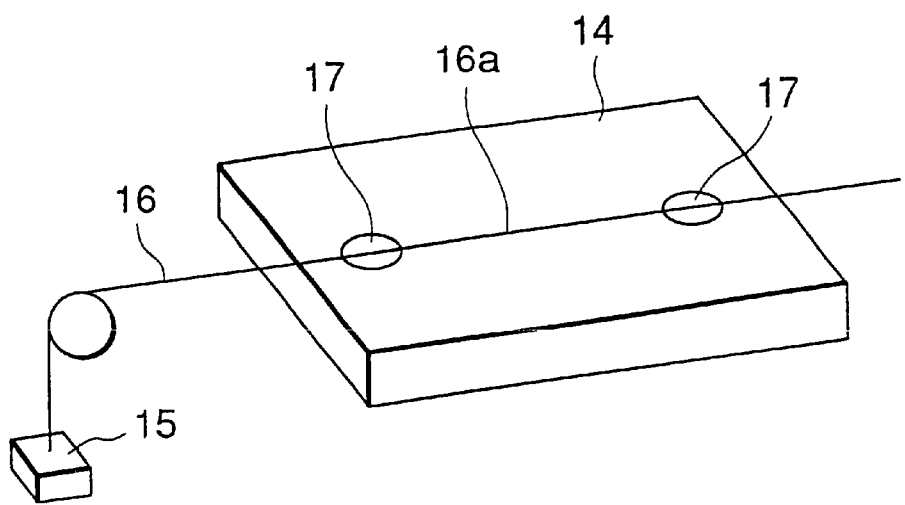
FIG. 2 is a perspective view showing a glass ceramic substrate having a negative coefficient of thermal expansion with the FBG fixed on its surface.
Figure 3:
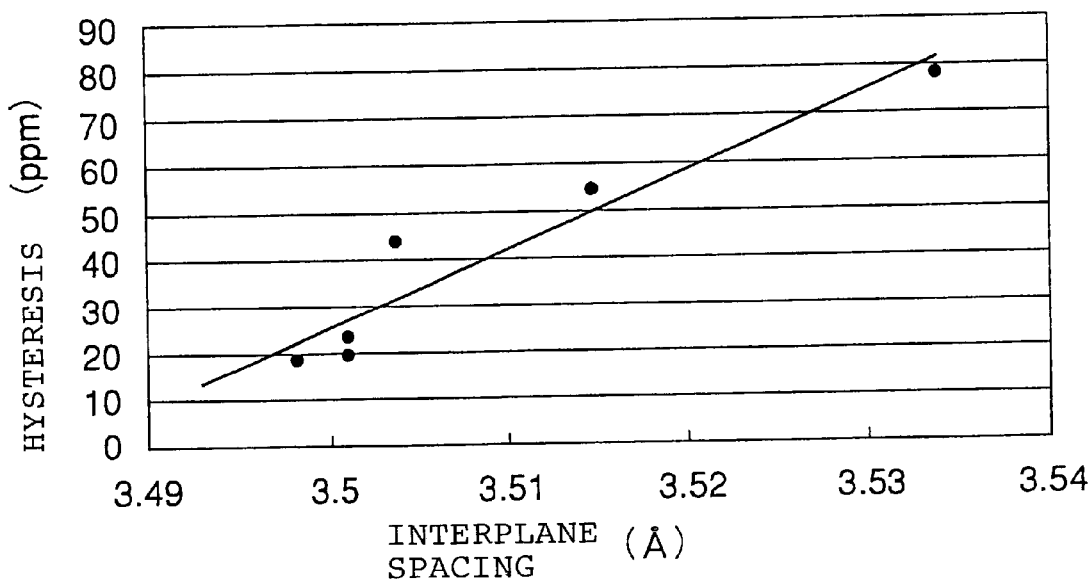
FIG. 3 is a graph showing the correlation between an interplanar spacing of crystal planes of a polycrystalline body and a hysteresis.

FIG. 3 shows the correlation between the interplanar spacing of the crystal planes of the polycrystalline body and a hysteresis. From this figure, it will be understood that, as the interplanar spacing becomes smaller, the hysteresis also becomes smaller. If the interplanar spacing is 3.52 Å or greater, the effect of diminishing the hysteresis as the temperature compensating member is insufficient. In addition, the variation rate of the hysteresis depending upon environmental factors such as temperature and humidity becomes large, resulting in a difficulty in obtaining a device having stable characteristics.

As the interplanar spacing of the crystal planes of the polycrystalline body becomes smaller, the hysteresis also becomes smaller. However, if the interplanar spacing is excessively small, crystals of different kinds are precipitated so that the coefficient of thermal expansion is shifted in a positive direction or the linearity of the thermal expansion is deteriorated. Taking this into account, the interplanar spacing should be suitably selected depending upon applications or characteristics of the device. It is noted here that the interplanar spacing preferably has a value between 3.491 and 3.519 Å, more preferably, between 3.495 and 3.512 Å.

As shown in IEICE General Conference C-3-46, 1997, even if a material having a negative coefficient of thermal expansion is used as a substrate of the type, the temperature dependency of a reflection center wavelength may intensely be exhibited depending upon a temperature range so that a sufficient temperature compensating function cannot be obtained. This results from the poor linearity of thermal expansion of the substrate material.

Therefore, supposing a line (virtual line) connecting opposite ends of a thermal expansion curve of the sample, finding a temperature at which the deviation of the measured curve from the virtual line is maximum, and calculating a value obtained by dividing a difference in sample length between the virtual curve and the measured curve at the above-mentioned temperature by an initial sample length before the test, it is desirable that the value thus calculated is restricted to 60 ppm or less. In this event, the linearity of the thermal expansion becomes excellent so that a sufficient temperature compensating function can be obtained in any temperature range.

As a method of changing the interplanar spacing of the crystal planes of the polycrystalline body, there are various methods. For example, use may be made of a method of adjusting a composition of the polycrystalline body or a method of carrying out ion exchange after producing the polycrystalline body.

A preferable range of the composition suitable for diminishing the interplanar spacing of the crystal planes of the polycrystalline body is, by weight %, 45–60% $SiO_2$, 20–45% $Al_2O_3$, 7–12% $Li_2O$, 0–4% $TiO_2$, and 0–4% $ZrO_2$. By controlling the content of each of the ingredients to a desired value within the above-mentioned composition range, the interplanar spacing can be adjusted to less than 3.52 Å. In addition to the above-mentioned ingredients, it is possible to add other elements, such as MgO or $P_2O_5$, up to 10 weight %.

In case where the polycrystalline body is produced by re-heating and crystallizing a glass obtained by melting a raw material followed by cooling and solidifying, adjustment of the interplanar spacing may sometimes be difficult in order to maintain a good meltability and a good formability of the glass. On the other hand, in case where the polycrystalline body is produced by sintering powdery materials, adjustment is possible by the kinds and the ratios of the powdery materials prior to sintering without being restricted by the meltability and the formability of the glass. Furthermore, not only a plate shape but also any complicated shape can be easily formed at a low cost by a method such as press forming, cast forming, or extrusion forming. In view of the above, it is preferable to produce the polycrystalline body by sintering the powdery materials. As the powdery materials, use may be made of amorphous glass powder, crystalline glass powder, partially crystallized glass powder, and glass powder prepared by a sol-gel method. Besides those mentioned above, sol or gel may be added.

Preferably, the temperature compensating member has the coefficient of thermal expansion of $(-25$ to $-120) \times 10^{-7}/°$ C. (more preferably, $(-50$ to $-90) \times 10^{-7}/°$ C.) in a temperature range between $-40$ and $100°$ C.

Moreover, in case where the polycrystalline body is produced by sintering the powdery materials, it is possible to easily make a groove or a through-hole at a predetermined position simultaneously with the forming. Thus, a great advantage is achieved in manufacturing of an optical communication device. For instance, an optical fiber of an FBG is adhered and fixed to the temperature compensating member by the use of an adhesive (for example, glass frit or epoxy resin). If a groove or a through-hole is formed at a predetermined position of the temperature compensating member, assembling is easily automated upon carrying out the adhering operation so that a production cost is lowered. The groove or the through-hole is not restricted to one position but may be formed at a plurality of positions.

By selecting the diameter of the groove or the through-hole mentioned above to be close to that of the device, it is possible to reduce the amount of the adhesive to be used and to achieve the fixation with a thin adhesive layer. Such a thin adhesive layer decreases a stress due to a difference in thermal expansion between the adhesive and each of the device and the temperature compensating member. Accordingly, it is possible to perform the adhesion and the fixation throughout the overall length of the groove or the through-hole and to prevent the device from being bent even if the temperature compensating member contracts from the length upon fixing.

Generally, upon fixing a fiber-shaped device such as an FBG to the temperature compensating member, it is necessary to preliminarily apply the device with tension to prevent the device from being bent when the temperature compensating member contracts from the length upon fixing. On the contrary, according to the present invention, it is unnecessary to preliminarily apply the tension. Therefore, an optical device having a temperature-compensating function can be produced in a simpler process. Especially, in case where a precise through-hole is formed in the temperature compensating member and the device is inserted into the through-hole, the temperature compensating member serves as a component for positioning the device and as a connecting component when the device having a temperature-compensating function is connected to an optical fiber or another device.

Next referring to FIGS. 4 and 5, description will be made about optical communication devices according to embodiments of the present invention.

The above-described temperature compensating member contains a crystal having anisotropy mainly in a behavior of thermal expansion, for example, β-quartz solid solution. Therefore, one crystal axis of the crystal having anisotropy in behavior of thermal expansion shows an extremely large negative coefficient of thermal expansion, that is, a negative coefficient of thermal expansion as large as $-120 \times 10^{-7}/°$ C. at maximum. The anisotropy in behavior of thermal expansion causes fine gaps to be produced in a crystal grain boundary so that the mechanical strength tends to be decreased. Consequently, a problem may arise in case where a large stress is applied from the outside when the optical communication device is assembled or the optical communication device is installed.

Figure 4:
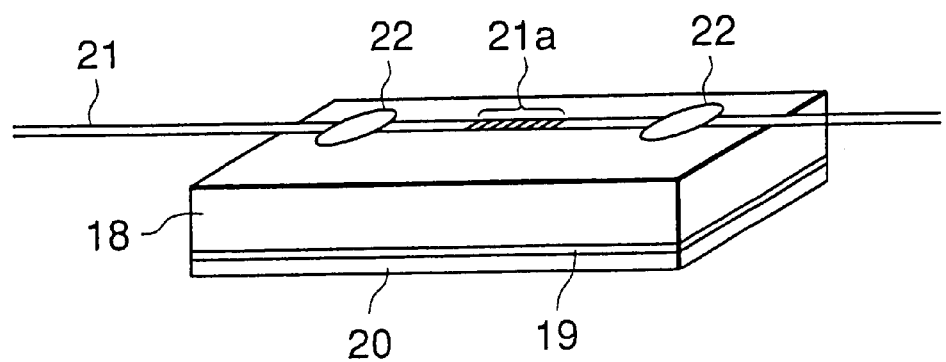
FIG. 4 is a perspective view of an optical communication device according to a first embodiment of the present invention.

The optical communication device in FIG. 4 includes a temperature compensating member 18 of a plate shape having a negative coefficient of thermal expansion. To one surface, for example, a bottom surface or a side surface of the temperature compensating member 18, a reinforcing member 20 is adhered by the use of an adhesive 19 having a low elasticity. To the other surface, for example, the top surface of the temperature compensating member 18, an optical fiber 21 as an optical component having a positive coefficient of thermal expansion is adhered by the use of an adhesive 22 on both sides of a grating portion 21a.

Since the above-mentioned optical communication device is high in mechanical strength, a problem will hardly arise even if a large stress is applied from the outside upon assembly or installation. Further, expansion and contraction of the temperature compensating member 18 due to temperature changes are not easily prevented.

Herein, the adhesive 19 having a low elasticity is used in order that the expansion and contraction of the temperature compensating member 18 due to temperature change are not easily prevented by the reinforcing member 20 having a coefficient of thermal expansion greater than that of the temperature compensating member 18. Preferably, the adhesive 19 contains a silicone resin because the adhesive 19 can be lowered in elasticity.

It is preferable that the reinforcing member 20 has a coefficient of thermal expansion of $200 \times 10^{-7}/°$ C. or less in a temperature range between −40 and 100° C. because the expansion and contraction of the temperature compensating member 18 due to the temperature change are not easily prevented. The reinforcing member 20 is not particularly limited but may be any material, such as metal, glass, and ceramic, as long as its mechanical strength is greater than that of the temperature compensating member 19. Especially, stainless steel, an Invar alloy, and a crystallized glass are preferable because they are excellent in chemical resistance so that the surface of the reinforcing member 20 is not deteriorated and detachment hardly occurs at a boundary between the adhesive 19 and the reinforcing member 20. Moreover, the Invar alloy and the crystallized glass are preferable because they are small in coefficient of thermal expansion to be therefore hardly prevent expansion and contraction of the temperature compensating member 18 due to temperature change.

Figure 5:
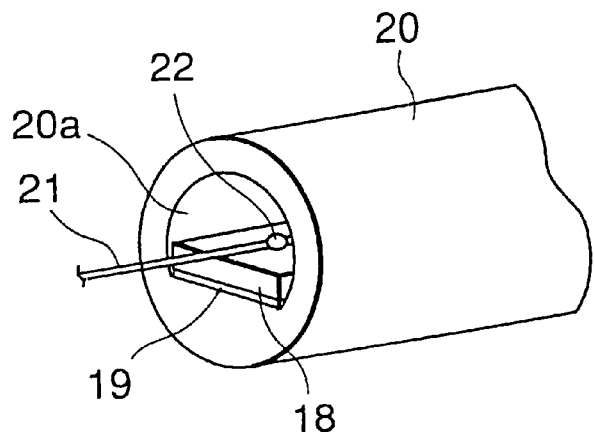
FIG. 5 is a perspective view of a characteristic part of an optical communication device according to a second embodiment of the present invention.

In the optical communication device in FIG. 5, a reinforcing member 20 is formed into a columnar body having a through-hole 20a. A temperature compensating member 18 with an optical fiber 21 fixed thereto is inserted into the through-hole 20a and adhered to an inner wall surface of the through-hole 20a by the use of an adhesive 19. Specifically, the reinforcing member 20 is formed into a cylindrical shape with a horizontal center axis so as to surround the temperature compensating member 18 and the optical fiber 21. Herein, the columnar body means a structure such that an outer periphery of its cross section has a substantially polygonal or circular shape.

In the above-mentioned optical communication device, not only the mechanical strength is improved but also the reinforcing member 20 serves to prevent and protect the optical fiber 21 from contamination or external force.

In addition, the reinforcing member 20 may be provided with a slit formed a substantially upper portion thereof to be in parallel to the through-hole 20a. Alternatively, the substantially upper portion of the reinforcing member 20 may be partially cut away, and the cut-away part may be used as a cover to open and close the through-hole 20a. In this case, the optical fiber 21 need not be partially cut but can be fixed to the temperature compensating member 18 while it is inserted in the through-hole 20a. Therefore, workability is excellent.

An air-tight structure in which the both ends of the through-hole 20a of the reinforcing member 20 are closed by covers (not shown) is preferable in view of prevention of contamination or protection from entry of water.

Furthermore, in each of FIGS. 4 and 5, it is preferable to preliminarily coat the optical fiber 21 with a coating member (not shown) except a grating portion 21a and an adhering portion to the temperature compensating member 18. This is because the optical fiber 21 will hardly be damaged or broken by an edge portion of the temperature compensating member 18 or the reinforcing member 20 when the optical communication device is assembled.

It is preferable that the adhesive 22 is made of an organic polymer, because the adhesion is possible in a short period of time and at a low temperature in comparison with an adhesive of glass or metal.

If the viscosity of the adhesive 22 prior to curing is 2500–100000 mPa·s at 25° C., the wettability of the adhesive 22 to the temperature compensating member 18 becomes adequate so that the adhesion is not released or loosened. If the viscosity of the adhesive 22 prior to curing is less than 2500 mPa·s at 25° C., the wettability to the temperature compensating member 18 becomes too high to keep the adhesive throughout the entire periphery of the optical fiber 21, resulting in a decrease in adhesive strength between the optical fiber 21 and the adhesive 22. On the other hand, if the viscosity of the adhesive 22 prior to curing is higher than 100000 mPa·s at 25° C., the wettability to the temperature compensating member 18 becomes poor, resulting in a decrease in adhesive strength between the adhesive 22 and the temperature compensating member 18.

The adhesive 22 preferably has a contraction rate upon curing equal to 5% or less. In this event, the tension applied to the grating portion 21a of the optical fiber 21 does not substantially increase upon curing.

It is noted here that the viscosity of the adhesive 22 at 25° C. prior to curing can be adjusted by selecting a kind, a molecular weight, and a concentration of the polymer, a kind or an amount of a filler, an amount of a solvent, and so on. Further, the contraction rate of the adhesive 22 upon curing can be reduced by an increase in degree of polymerization of the polymer upon curing, an addition of the filler or an increase in amount thereof, and a decrease in amount of the solvent. Especially, an epoxy resin is preferable because its contraction rate upon curing is small and has a great effect of decreasing a contraction rate of the adhesive upon curing.

Furthermore, it is preferable that the surface roughness (Ra) of a portion of the temperature compensating member 18 to which the adhesive 22 is applied is 5 $\mu$m or less, because the wettability of the adhesive 22 to the temperature compensating member 18 becomes good so that the adhesion is not released or loosened.

The wettability of the adhesive 22 to the temperature compensating member 18 can be evaluated by a contact angle. If the contact angle falls within an angular range between 20° and 80°, the adhesion is not released or loosened so that the temperature compensating function is not easily lost or deteriorated.

In addition, the adhesive 22 is preferably a UV-curing resin. The UV-curing resin is easily adhered in a short period of time and at a low temperature. If UV curing is followed by heat treatment at a temperature at which the characteristics of the optical component are not deteriorated, the adhesive strength increases although a curing period becomes slightly longer.

The above-described optical communication device has a stable temperature compensating characteristic and is high in mechanical strength, because of use of the temperature compensating member which is small in hysteresis of thermal expansion and high in stability of the hysteresis against environmental changes.

In the foregoing, the example using the optical fiber as an optical component is shown. However, this invention is similarly applicable to the cases where optical components of other types are used.

Hereinbelow, description will be made in detail about the temperature compensating member in conjunction with various examples and a comparative example.

Table 1 shows the examples of the present invention (Samples Nos. 1–6) and the comparative example (Sample No. 7).

the change in hysteresis after the high-temperature high-humidity test were great. In addition, the linearity of thermal expansion was greater than 60 ppm. Thus, this sample was inappropriate as the temperature compensating member.

Figure 6:
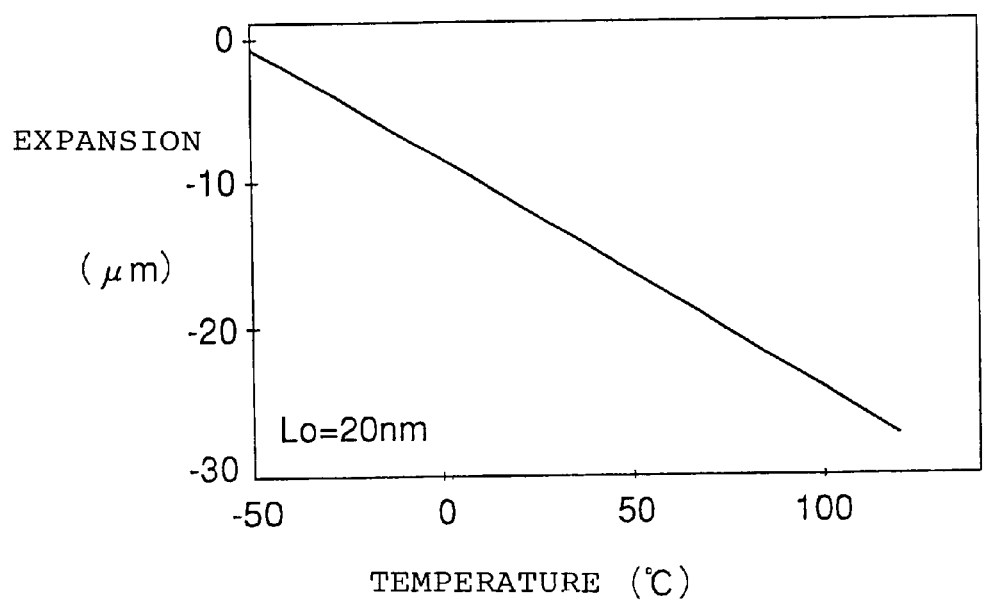
FIG. 6 is a graph showing a thermal expansion curve of Sample No.2 as an example.
Figure 7:
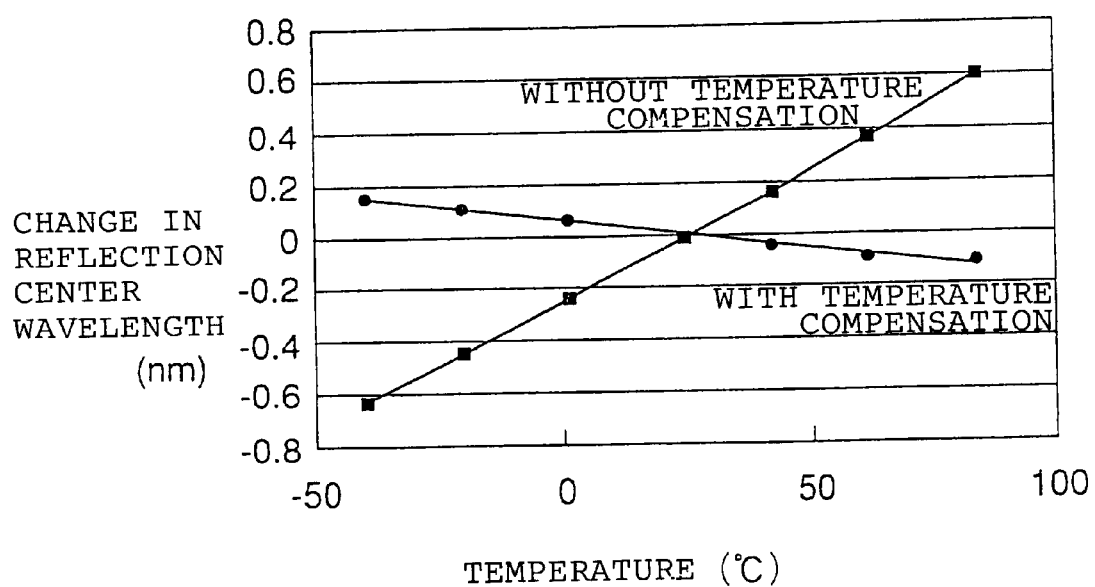
FIG. 7 is a graph showing temperature dependency of a reflection center wavelength of an FBG using a temperature compensating member which comprises Sample No. 2 as the example.

FIG. 6 is a graph showing a thermal expansion curve of Sample No. 2. FIG. 7 is a graph showing temperature dependency of the reflection center wavelength of the FBG using the temperature compensating member formed by Sample No. 2. From FIG. 6, it is understood that Sample No.

TABLE 1

| | Example | | | | | | Comparative Example |
|---|---|---|---|---|---|---|---|
| Sample No. | 1 | 2 | 3 | 4 | 5 | 6 | 7 |
| $SiO_2$ | 56.7 | 55.2 | 50.7 | 57.1 | 58.0 | 46.2 | 44.5 |
| $Al_2O_3$ | 31.6 | 33.0 | 36.8 | 30.4 | 31.0 | 40.9 | 43.0 |
| $Li_2O$ | 8.6 | 9.3 | 11.1 | 8.1 | 7.7 | 9.1 | 12.5 |
| $TiO_2$ | 1.0 | 0.8 | 0.4 | 1.1 | 0.8 | 1.9 | — |
| $ZrO_2$ | 1.2 | 1.0 | 0.5 | 1.6 | 1.4 | 1.9 | — |
| MgO | 0.2 | 0.2 | 0.1 | 0.3 | 0.3 | — | — |
| $P_2O_5$ | 0.7 | 0.5 | 0.4 | 1.4 | 0.8 | — | — |
| Kind of crystal | β-Q s. s. | β-Q s. s. | β-Q s. s. | β-Q s. s. | β-Q s. s. | β-E s. s. | β-E s. s. |
| Interplanar spacing (Å) | 3.498 | 3.501 | 3.519 | 3.496 | 3.493 | 3.515 | 3.534 |
| Coefficient of thermal expansion ($\times 10^{-7}/°$ C.) | −57 | −78 | −95 | −34 | −26 | −64 | −98 |
| Hysteresis (ppm) | | | | | | | |
| Initial Value | 18 | 23 | 57 | 8 | 7 | 55 | 78 |
| After high-temperature high-humidity | 20 | 26 | 69 | 8 | 7 | 68 | 150 |

In Table 1, each of Samples Nos. 1–5 and No. 7 was prepared in the following manner. At first, raw materials were blended so that the polycrystalline body after sintering would have the composition (weight %) in the table. Thereafter, the blended batch was put in a mold and press-formed under the pressure of 20 MPa to produce a molded body (a compact body) having a rectangular-section columnar shape of a width of 4 mm, a thickness of 3 mm, and a length of 40 mm. Then, the molded body was sintered at 1350° C. in air for 15 hours and then cooled to the room temperature to obtain a polycrystalline body of β-quartz solid solution.

As regards Sample No. 6, the raw materials were blended so that the polycrystalline body after crystallization would have the composition (weight %) in the table. Thereafter, the blended batch was melted at 1500° C. for 7 hours, and rapidly cooled to produce a glass. Then, the glass was heated at 1350° C. for 15 hours to be crystallized. Thus, the polycrystalline body in which β-eucryptite solid solution was precipitated was obtained.

The raw materials of the polycrystalline body can be suitably selected from various minerals and compounds. In the table, β-Qs.s. represents β-quartz solid solution while β-Es.s. represents β-eucryptite solid solution.

As apparent from Table 1, each of Samples Nos. 1–6 comprised β-quartz solid solution or β-eucryptite solid solution, had a negative coefficient of thermal expansion within a range of (−26 to −95)×10$^{-7}$/° C., and had a small interplanar spacing less than 3.52 Å. Therefore, an initial hysteresis is small and the variation in hysteresis after a high-temperature high-humidity test is also small. Thus, these samples are suitable as the temperature compensating member. In addition, each sample had a linearity of thermal expansion of 60 ppm or less.

On the other hand, Sample No. 7 had an interplanar spacing as large as 3.534 Å so that the initial hysteresis and 2 exhibits a good linearity of thermal expansion. From FIG. 7, it is understood that the temperature dependency of the reflection center wavelength of the FBG having temperature compensation is very small in comparison with the case of no temperature compensation and is stable in any temperature range.

An optical communication device comprising Sample No. 2 (4×40×2 mm) and a stainless steel plate (4×40×1 mm) adhered to the bottom surface thereof by an adhesive of a silicone resin had a breaking load of 9 kgf corresponding to a high mechanical strength, and was small in temperature dependency of the reflection center wavelength.

On the other hand, another optical communication device comprising Sample No. 2 which was not reinforced by a reinforcing member had a breaking load of 1.5 kgf corresponding to a low mechanical strength.

Another optical communication device was produced by adhering an FBG to the top surface of the temperature compensating member comprising Sample No. 2 by the use of an adhesive of an epoxy resin having a viscosity of 4000 mPa·s at 25° C. and a contracting rate of 0.2% upon curing. In this device, the characteristics of the FBG were not degraded because the adhesion could be carried out at a low temperature. Further, since the wettability of the adhesive to the temperature compensating member was excellent, the adhesion was not released or loosened. Furthermore, since the contract rate upon curing was low, the temperature compensating function was neither lost nor deteriorated by an increase in tension applied to the optical fiber.

The kinds of crystals in Table 1 and the interplanar spacing of the crystal planes giving a main peak were determined by the X-ray diffraction. The coefficient of thermal expansion and the hysteresis were measured by a dilatometer. The coefficient of thermal expansion was measured within a temperature range between −40 and 100° C.

The hysteresis was obtained by repeatedly heating and cooling each sample within a temperature range between −40 and 100° C. at a rate of 1° C./min., measuring a difference between the lengths of the sample at 30° C. during heating and during cooling, and dividing the difference by the initial sample length before the test. The hysteresis after a high-temperature high-humidity test was a value obtained after leaving in an environment of 70° C. and 85% RH for 500 hours. The breaking load was measured by a method according to JIS R 1601.

The viscosity of the adhesive was measured by the use of a viscometer of a HB type (manufactured by Brookfield Corp.) at 25° C. and at a shear rate of $4S^{-1}$. The contracting rate upon curing was measured by a specific gravity cup method.

Each of the above-described temperature compensating members is small in hysteresis of thermal expansion, has a high stability of hysteresis against environmental changes, and can be produced at a low cost. Therefore, use is suitably made as the temperature compensating member in an optical communication device such as the FBG, a coupler, and a waveguide.

INDUSTRIAL APPLICABILITY

The temperature compensating member according to the present invention is suitable as the temperature compensating member in the optical communication device such as the FBG, the coupler, and the waveguide.

What is claimed is:

1. A temperature compensating member which comprises a polycrystalline body containing, as a main crystal, one of β-quartz solid solution and β-eucryptite solid solution, which has a value less than 3.52 Å as an interplanar spacing of the crystal planes giving a main peak in X-ray diffraction measurement, and which has a negative coefficient of thermal expansion.

2. A temperature compensating member as claimed in claim 1, wherein said polycrystalline body is a sintered powder body.

3. A temperature compensating member as claimed in claim 1, wherein said member has a coefficient of thermal expansion of $(-25 \text{ to } -120) \times 10^{-7}/°$ C. within a temperature range between −40 and 100° C.

4. An optical communication device comprising a temperature compensating member claimed in claim 1 and an optical component having a positive coefficient of thermal expansion and fixed on one surface of said temperature compensating member.

5. An optical communication device as claimed in claim 4, further comprising a reinforcing member adhered to the other surface of said temperature compensating member by the use of an adhesive having a low elasticity.

6. An optical communication device as claimed in claim 5, wherein said reinforcing member is a columnar body having a through-hole, said temperature compensating member being placed in the through-hole of said reinforcing member.

7. An optical communication device as claimed in claim 4, wherein said optical component is fixed to said temperature compensating member by the use of an adhesive, said adhesive comprising an organic polymer and having a viscosity between 2500 and 100000 mPa·s at 25° C. prior to curing and a contracting rate of 5% or less upon curing.

* * * * *